United States Patent [19]

Chari

[11] 4,037,258
[45] July 19, 1977

[54] READ/WRITE APPARATUS FOR MAGNETIC RECORDERS

[75] Inventor: Srinivasan V. Chari, Foster City, Calif.

[73] Assignee: Xerox Corporation, Stamford, Conn.

[21] Appl. No.: 654,491

[22] Filed: Feb. 2, 1976

[51] Int. Cl.$^2$ ............................................. G11B 15/12
[52] U.S. Cl. ......................................... 360/63; 360/61
[58] Field of Search ....................... 360/61, 62, 63, 64, 360/123, 13, 67

[56] References Cited

U.S. PATENT DOCUMENTS

| | | | |
|---|---|---|---|
| 2,879,500 | 3/1959 | Vaughan | 360/123 |
| 3,233,230 | 2/1966 | Camp | 360/123 |
| 3,243,782 | 3/1966 | Underwood | 360/61 |
| 3,637,928 | 1/1972 | Poulett | 360/62 |
| 3,697,678 | 10/1972 | Belleson | 360/61 |
| 3,911,484 | 10/1975 | Mutov et al. | 360/61 |
| 3,930,266 | 12/1975 | Okamoto | 360/62 |

Primary Examiner—Jay P. Lucas
Attorney, Agent, or Firm—M. J. Colitz; T. J. Anderson

[57] ABSTRACT

A read/write apparatus for magnetic recorders including a decoder for converting input digital control and data signals into a plurality of select signals, a voltage source switchably connected to the read/write heads of the apparatus such that individual select lines are enabled for determining which recording head is actuated for writing on a chosen magnetic medium, what orientation of magnetic flux will be written, and what magnitude of flux will be written. Also, the select lines operate, when the voltage source is disabled, to condition the heads to allow read-out of data recorded on the magnetic media, and to select which head is to perform this read-out. Also included in the recorder is a signal redigitizer to digitize data read from the magnetic media, and erase means for reducing edge and transient effects on the magnetic media.

12 Claims, 1 Drawing Figure

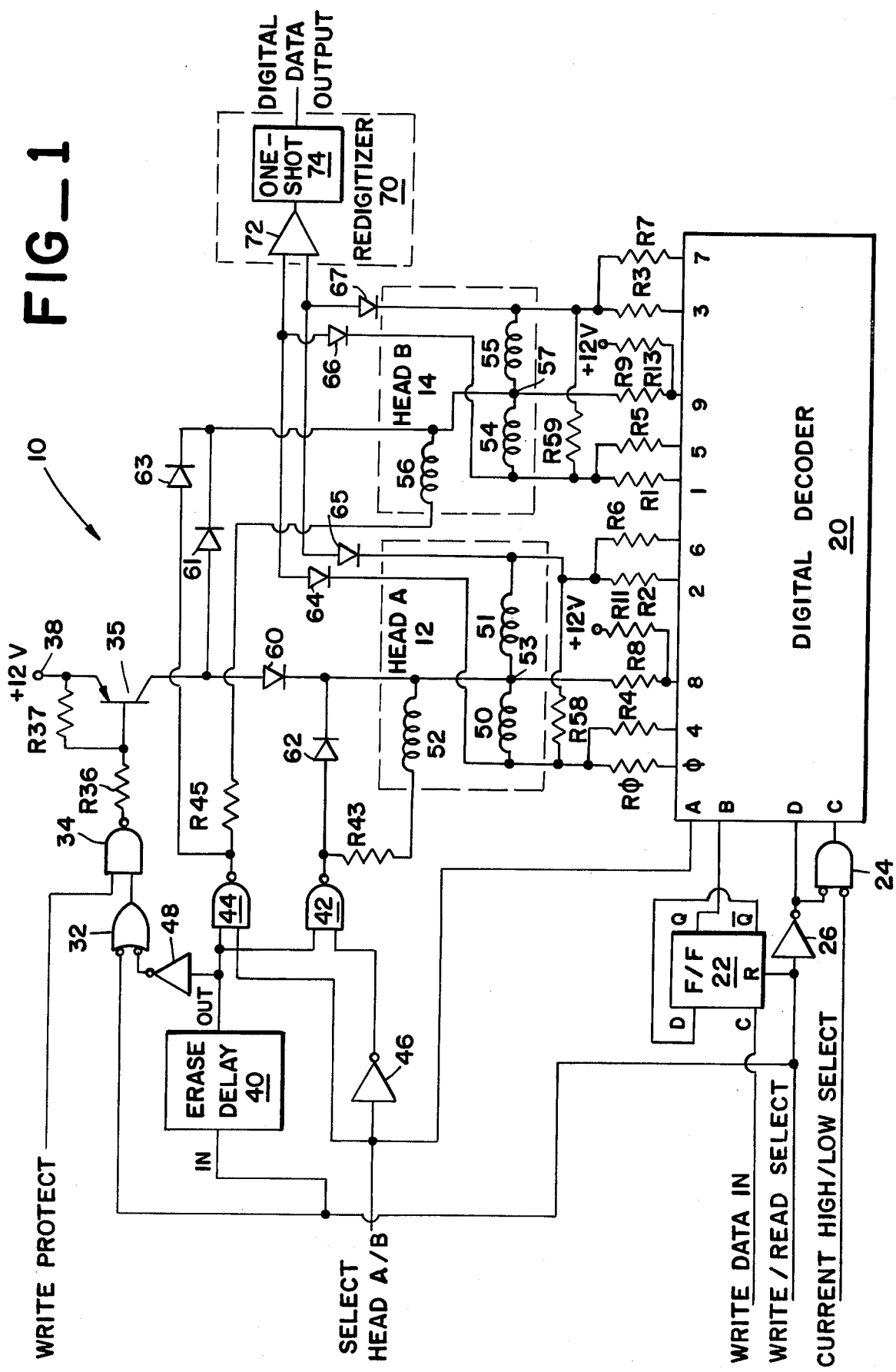

READ/WRITE APPARATUS FOR MAGNETIC RECORDERS

BACKGROUND OF THE INVENTION

1. Field of the Invention

The present invention relates generally to digital data recording and reproducing systems, and more specifically to a system that provides, in conjunction with a pair of magnetic flexible discs as recording media, for a unique means of data read/write control, including function select means comprising a four-line to ten-line digital decoder.

2. Description of the Prior Art

In prior art systems, each separate functioning aspect of the recording heads is normally controlled by the state of discrete transistor current sources. Also, such systems have used function control or select means that have been complex interconnections of individual logic gate components. The problem is that such systems are costly and subject to increased reliability and maintenance problems. Some even require trimming resistors to be installed by technicians after system assembly has been completed, to insure that the current source is drawing the correct level of current. In the highly competitive disc drive market, it is economically desirable to provide a simpler and more reliable control system.

SUMMARY OF THE INVENTION

The present magnetic recorder invention eliminates the need for discrete transistor current sources, and further allows the use of standard types of integrated circuits for lower cost and improved reliability. The device uses a magnetic medium to both record and reproduce data inputted to the device in the form of digital pulses.

Broadly stated, the invention uses a digital decoder to control the writing and reading functions in a magnetic recorder having two recording discs. The decoder decodes four input lines, whose states reflect the function desired, and generates, based on this input, and output signal on one of the decoder's 10 output lines. These output signals operate to control the two recording and reproducing heads. During write operations, since the heads are energized by means of a voltage source, resistors connected in series between the decoder output lines and the recording heads determine the current created in the head windings and thus the recording level produceable on the magnetic discs. The decoder also selects which head is to be sensed during read-out by the recorder read means.

Accordingly, it is the principal object of this invention to use a digital decoder in combination with a voltage source to provide a simple and inexpensive system for controlling the writing of data on a pair of magnetic discs and for enabling subsequent read-out of such data.

Another object of this invention is to provide a system that uses a voltage source instead of a current source for write operations so that the circuit does not require any trimming resistors to be added, thus minimizing technician time required to make the circuit reliably operational.

Still another object of this invention is to provide a system that takes advantage of standard state-of-the-art microcircuits, such as the decoder circuit, to minimize component count in the system.

A still further object of this invention is to provide a system that uses essentially only one set of circuits to access and control two magnetic discs to thereby save on circuitry required for multiple disc systems.

BRIEF DESCRIPTION OF THE DRAWING

FIG. 1, the single FIGURE of the drawing, illustrates a circuit schematic incorporating the present invention.

DESCRIPTION OF THE PREFERRED EMBODIMENT

1. General

FIG. 1 shows a read/write apparatus 10 for magnetic recorders. The apparatus 10 provides the ability for accessing and controlling two magnetic media, with each medium having its own separate recording and reproducing head. The recording heads are positioned such that each medium moves with respect to its head, to enable data to be written into and read off of the media in a conventional way. The present apparatus is preferably used with a pair of rotating magnetic discs, each having 76 concentric tracks available for data recording. The heads are positioned mechanically over the track desired, such that when positioned therewith, the head is exposed to the entire track length in one revolution of the disc.

The apparatus 10 control and data lines include the SELECT HEAD A/B line, the WRITE/READ SELECT line, and the CURRENT HIGH/LOW line. There is also an input data line, WRITE DATA IN. A WRITE PROTECT line is also shown in Fig. 1 as a control line, but its purpose, to add a second level of protection against unwanted writing on the media, is not as essential aspect of the invention and will only be briefly referred to hereinafter. The SELECT HEAD A/B line functions to indicate to the apparatus 10 which of the heads, head A shown at 12, or head B shown at 14, is desired to be used for recording or reproducing. The WRITE/READ SELECT line determines whether the operation performed on the chosen head is a record or read-out operation, and the CURRENT HIGH/LOW SELECT line operates to vary the current through the head to thus control the strength of magnetic variations produced on the medium thereby. The WRITE DATA IN line acts to determine the direction of the magnetic flux variations that are written on the medium by the chosen head, with a flux reversal, i.e. a reversing of the direction of flux, generated on the medium when each new data pulse is detected on the data line by the apparatus 10.

The main component used in the apparatus 10 is the digital decoder/driver 20. It selects and actuates the system control functions desired in response to the state of said input control and data lines. Decoder 20 operates by allowing only one, or none, of the ten decoder output lines $\phi$-9 to be activated for any given state of the four decoder 20 inputs A-D. As shown in Table I, each output line is actuated by a different combination of input state of the four input lines. The output functions enabled by the output lines $\phi$-9 are further explained below.

As shown in Fig. 1, the lowest-order input to the decoder 20 is input A, which has the SELECT HEAD A/B line coupled to it. This is because all other functions selectable by the decoder involve access to one or the other of the heads. Thus, if input A is low, i.e. in a 0 state, head A responds to the function selected via the inputs to lines B, C, and D. If input A is high, i.e. in a 1 state, head B responds to the function selected via the inputs to lines B, C, and D.

Input B is the next higher order input to the decoder 20. It is fed by a flip-flop 22 which operates, when not inhibited by the WRITE/READ SELECT line, to change state on the positive going edge of each pulse coupled to the c (clock) input of the flip-flop. Thus, each successive pulse causes alternate high and low levels to be inputted to the decoder 20. The decoder 20 uses this information only during the writing of data on the medium, and acts to enable the operation of either a first winding of the chosen recording head, to thereby create a magnetic variation in a first direction, or a second winding of the chosen recording head to thereby create a magnetic variation in a second direction. A flux reversal occurs when flip-flop 22, and thus input B of decoder 20, changes state.

Input C, the next higher order input to the decoder 20, has coupled to it the CURRENT HIGH/LOW SELECT line via AND gate 24. This function is provided because each track on a recording medium has an optimum current for recording magnetic signals. If the current is too low, the recorded signal will be unnecessarily weak; if it is too high, it will interfere with adjacent signals on the disc. Greater signal density on the inner tracks of the disc requires a reduced optimum current because of greater interference with adjacent signals. The CURRENT HIGH/LOW SELECT line provides the ability to have two levels of recording current available so that a group of tracks closest to the center of the disc are recorded with a lower recording current than the tracks at the outer edge. In the preferred embodiment, the transfer point form one current to the other is on track (43). However, the optimum current also varies for different media, so that any current switchover point may be chosen as desired by the magnetic recorder user.

Finally, input D, the highest order input to the decoder 20, has coupled to it the WRITE/READ SELECT line (W/R SEL) via inverter 26. The state of this line determines whether one of the eight write functions or one of the two read functions are enabled by the other inputs A–C. When the W/R SEL line is low, the decoder 20 input D goes high indicating a read select state. Conversely, when the W/R SEL line is high, the D input is low, indicating a write select state. Note that in the read select state, the W/R SEL line also acts to lock out any control line input to inputs B and C of the decoder 20. This is due to the fact that the decoder 20 requires these lines to be held in a low state when read operations are being performed. Input B is kept low, i.e. in a 0 state, by keeping the flip-flop 22 reset via the flip-flops R (reset) input. The reset input causes the Q output of flip-flop 22 to be locked in a low state when a 0 is coupled to the reset input on the W/R SEL line. Input C is kept low since the W/R SEL line controls AND gate 24 via the inverter 26. Therefore, when the W/R SEL line indicates a read select state, a high is coupled to the gate 24 which locks the output of gate 24 to a low state.

TABLE I

| Inputs D C B A | OUTPUT LINE SELECTED | FUNCTION SELECTED |
|---|---|---|
| Write Functions | | |
| 0 0 0 0 | 0 | WRITE "0" DATA, LO CURRENT, HEAD A |
| 0 0 0 1 | 1 | WRITE "0" DATA, LO CURRENT, HEAD B |
| 0 0 1 0 | 2 | WRITE "1" DATA, LO CURRENT, HEAD A |
| 0 0 1 1 | 3 | WRITE "1" DATA, LO CURRENT, HEAD B |
| 0 1 0 0 | 4 | WRITE "0" DATA, HI CURRENT, HEAD A |
| 0 1 0 1 | 5 | WRITE "0" DATA, HI CURRENT, HEAD B |
| 0 1 1 0 | 6 | WRITE "1" DATA, HI CURRENT, HEAD A |
| 0 1 1 1 | 7 | WRITE "1" DATA, HI CURRENT, HEAD B |
| Read Functions | | |
| 1 0 0 0 | 8 | READ HEAD A |
| 1 0 0 1 | 9 | READ HEAD B |

Besides controlling some of the functions performed by the decoder 20, the W/R SEL line also acts to control the actuation of a transistor switch 35, via OR gate 32 and AND gate 34. Once actuated, transistor 35 enables the +12 volt voltage source 38 to couple through to the recording heads. Transistor 35 is conventionally biased by resistors R36 and R37, as shown in Fig. 1. Transistor 35 is kept off by the W/R SEL line when the apparatus 10 is reading out data. The WRITE PROTECT line is also coupled to AND gate 34. It functions to lock out the W/RSEL signal, when needed, to insure the transistor 35 is not erroneously turned on. This adds a further safety factor against accidental overwriting.

Lastly, the W/R SEL line controls actuation of an erase winding on each head. Note that such an erase winding can also be on a second head positioned relative to the recording and reproducing head. The W/R SEL line signal is first delayed in a conventional way by means of an erase delay 40 to compensate for the physical position of the erase winding with respect to the record and reproduce windings. The delay is required since after a given area on the medium moves past the recording head, a finite length of time passes before this area on the medium moves past the erase winding. The delay 40 allows for track edge trimming, i.e. erasure of magnetic transients and edge effects for proper track separation, either on the megnetic medium associated with head A or on the magnetic medium associated with head B. AND gates 42 and 44 are selectively enabled by the select head A/B control line to pass the output of the delay 40 to the chosen head. The output of delay 40 also controls transistor 35 via inverter 48 and OR gate 32. This allows for transistor 35 to remain on beyond the time that recording has taken place to allow continued track edge trimming until the last recorded information has had time to be passed under the erase head.

2. Write Operation

As mentioned above, the decoder 20 selectively enables a recorder function based on the present state of the decoder 20 input lines A–D. Taking as an example the first function listed in Table I, the input seen on lines A–D is the binary word 0000. The effect of this word on the decoder 20 is that it causes output line 0 to switch to a low state. The decoder 20 of the present invention can be a conventional integrated circuit of the 7445 family of decoders which leaves all of its outputs in a floating or high state except for the output line chosen by the state of the input lines A–D, which is switched to ground. A commerical example of a presently preferred integrated circuit decoder is the SN 7445 BCD-to-Decimal Decoder manufactured by Texas Instruments, Inc.

of Dallas, Tex. A description of such decoder may be found on pages 171 and 172 of the *TTL Data Book for Design Engineers* published by Texas Instruments, Inc. (Bulletin No. DL-S 7211816, December, 1972). As seen in Fig. 1, output line 0 is coupled through a resistor R0 to one leg of the winding 50 of head A, shown at 12. When the voltage source 38 is coupled to the centertap point 53 of head A via transistor 35, the grounding of resistor R0 causes a current to flow through winding 50, its amperage being a function of the voltage source 38 and the resistance of R0. The effect of the current is to create magnetic flux along a first direction on the magnetic medium.

If now another successive pulse is inputted to the apparatus 10 on the WRITE DATA IN line, flip-flop 22 changes state to create an input of 0010 on inputs A–D of decoder 20, input B having changed state. Thus, as indicated again in Table I, this input word causes output line 2 of the decoder to switch to ground, and line 0 to float high. As seen in Fig. 1, output line 2 is coupled to one leg of the winding 51 of head A through resistor R2. Note that windings 50 and 51 are connected together at centertap 53. Thus, instead of coupling current through windings 50, the voltage source coupled to centertap 53 generates current through winding 51 and resistor R2, its amperage being a function of the resistance of R2. The effect of current through winding 51 is to generate a flux reversal on the magnetic medium, since winding 51 creates a flux in a direction opposite to that of winding 50.

As an illustration of the operation of the CURRENT HIGH/LOW SELECT line, if one changes the state of this line, leaving the rest of the decoder 20 inputs as in the previous example, e.g. with the input word now comprising 0110, output line 6 becomes grounded. This causes the current through winding 51 to now have its amperage be a function of resistor R6 instead of R2. Thus, with the R6 resistance having a lesser value than R2, the resultant current is greater through R6 than through R2. Consequently, the grounding of one or the other of decoder 20 outputs 2 or 6 provides means for choosing one of a plurality of currents for energizing winding 51.

Similarly, the decoder 20 output line 0 and 4 function to selectively energize winding 50 of head A at two possible current levels. Output lines 1 and 5 of decoder 20 function to selectively energize winding 54 of head B at two possible current levels. Finally, output lines 3 and 7 of decoder 20 function to selectively energize winding 55 of head B at two possible current levels. Note that the two windings 54, 55 of head B are associated with each other at a centertap point 57 and also have the voltage source 38 coupled to head B at this centertap 57 via transistor 35, to function the same way as above for head A.

During the writing operation on either head, a DC erasure occurs by means of the operation of erase winding 52 on head A, and erase winding 56 on head B. The output of delay 40 actuates erase winding 52 via AND gate 42, and actuates erase winding 56 via AND gate 44. The operation of the windings 52, 56 are similar to the data windings 50, 51 and 54, 55, in that the voltage source 38 creates a current through the winding whose amperage is a function of an external resistance. Specifically, when AND gate 42 goes on, it generates a ground at its output. The signal is coupled to a resistor R43 connected to one leg of winding 52. The other leg of winding 52 is connected to the centertap point 53 of head A so that voltage source 38 is also available to couple current through this winding as a function of the resistance of R43. Similarly, for head B erasure, the output of AND gate 44 is connected to resistor R45 which is in turn connected to one leg of winding 56. This winding is connected to the centertap point 57 of head B. Thus, when gate 44 goes on, it grounds resistor R45, thereby generating a current in winding 56 whose amperage is a function of the resistance of R45.

The erasure effect is labeled DC because it is continuous for as long as a writing operation is being performed on a given head. Note again, however, that gates 42, 44 ensure that only the erasure winding associated with the head currently being used is actuated for erasure. Also, the windings 52, 56 are not energized at precisely the same time as are their associated windings because the erasure windings are physically located behind the recording windings relative to the recording medium tracks. Thus, since a finite time delay occurs between the time when a given point on the track is exposed to a recording head, and when it is subsequently exposed to the erasure head, delay 40 keeps the chosen one of the windings 52, 56 off until this time has elapsed. In the present embodiment, the delay before the erasure windings are activated is set at approximately 150 $\mu$s. However, as can be seen, a different medium speed and other factors would obviously alter this time interval.

As mentioned previously, the erase delay 40 also acts to keep the erasure winding 52, 56 that corresponds to the head currently being used for recording in an energized state for a time after recording has ceased. Again, this is due to the physical location of erasure windings 52, 56 with respect to the recording windings. To allow the windings 52, 56 to remain energized, the voltage source 38 continues to be coupled through to centertaps 53 and 57 until erasure is stopped. This is accomplished by having the delay 40 output also be coupled to the transistor 35 via inverter 48 and OR gate 32, as mentioned above. Thus, when the delay of erase delay 40 subsequently times out, if the W/R SEL line has not indicated that further write operations are required, the gate 32 goes off causing transistor 35 to also go off, thereby disengaging the voltage source from both head A and head B.

R58 and R59 are damping resistors placed across the windings 50, 51 and 54, 55. They function to prevent these windings from going into oscillation when going from an energized to an unenergized state and aid the collapse of the magnetic field in the head windings 50, 51 and 54, 55. Diodes 62 and 63, connected between respective AND gates 42, 44, and windings 52, 56, are added as field collapsing diodes to aid in the discharge of potential build-up in the windings 52, 56 when they are turned off. Diodes 60, 61 are isolation diodes which function to isolate the two centertaps 53, 57 of head A and head B, while allowing the voltage source 38 to be coupled in common to both centertaps.

3. Read Operation

When the W/R SEL line indicates that a read operation is desired, as described above, input lines B and C of decoder 20 are automatically locked in a low state. Thus, only the SELECT A/B line functions to change the decoder 20 state during a read operation. As seen in Table I, a binary word of 1000 coupled to inputs A–D of decoder 20, indicating that head A is desired to be read, causes output line 8 of decoder 20 to go to ground. Similarly, the binary 1001 input (i.e. the SELECT HEAD A/B line only changes state) indicates to the decoder 20 that head B is desired to be read. The decoder 20 responds by grounding line 9.

With the respect to the effect that grounding does have on head A, note first that the voltage source 38 is not coupled to the centertap 53 of head A since transistor 35 is off during a read operation. The DC potential at the inputs to the redigitizer 70 is maintained at about 6V, so that the isolation diodes 64 and 65 are forward biased, thus coupling any voltage signals generated in the head windings 50 and 51 to the opposite sides of a conventional differential amplifier 72 in the redigitizer 70. Centertap 57 of head B is coupled to voltage source 38 through a high value resistor R13, and thus a reverse bias on diodes 66 and 67 serves to isolate head B from redigitizer 70. When windings 50, 51 detect a flux reversal on the medium, i.e. a magnetic change from one direction to the other, it causes a voltage signal to be created across the windings. The amplifier 72 detects and amplifies this voltage signal. As a flux reversal is detected back in the opposite direction, a voltage signal of opposite polarity is created. The amplifier 72 similarly detects this pulse signal and amplifies it. Consequently, each flux reversal on the magnetic medium is responded to by the differential amplifier 72, to create a useable output thereby.

With respect to head B, a read operation occurs when output line 9 of the digital decoder 20 goes to ground. Output line 9 is coupled to centertap 57 of head B by resistor R9. Thus, as resistor R9 is coupled to ground, it acts to bias centertap point 57 of head B in the same manner as centertap 53 of head A is baised. Therefore, since isolation diodes 66 and 67 couple sensed potentials from head B to the differential amplifier 72 in the same manner as described above for the diodes 64, 65 of head A, the same reading operations are able to be performed for head B in the redigitizer 70. Note that in this mode, R11 acts to keep diodes 64, 65 reverse biased to isolate head A from the redigitizer 70.

The output of amplifier 72 feeds a conventional one-shot 74 that operates to create a digital pulse of a given pulse width upon the occurrence of each of the flux reversals sensed. The one-shot 74 is triggered by either positive or negative polarity voltage signals. The one-shot 74 output is fed out of the redigitizer as the DIGITAL DATA OUTPUT line of the apparatus 10. Note that the amplifier 72 can also be used to compensate in a conventional manner for high frequency distortions from the magnetic medium as well as certain timing distortions thereon.

What is claimed is:

1. In a read/write apparatus for magnetic recorders including a magnetic recording and reproducing head having at least one winding for converting electric signals into magnetic flux variations that may be recorded on a magnetic recording medium movable relative to said head and for converting said magnetic flux variations so recorded back into electric signals, the improvement comprising:

control means for generating a signal to be recorded, said control means including a digital decoder capable of numeric base transformations and having a plurality of inputs for receiving function control and data input signals and plurality of outputs normally at a first voltage state, wherein a predetermined number of said outputs will assume a second voltage state in response to the particular function control and data input signals applied at its inputs; and write means for generating said electric signals, said write means including a voltage source coupled to said head and capable of being applied across said winding when at least a predetermined one of said outputs is at its second voltage state, whereby current of a predetermined magnitude is made to flow through said winding.

2. The read/write apparatus of claim 1, wherein said predetermined number is one.

3. The read/write apparatus of claim 1, wherein current of a first magnitude is made to flow through said winding when said predetermined one output is at its second voltage state, and current of a second magnitude is made to flow through said winding when a predetermined other one of said outputs is at its second voltage state.

4. The read/write apparatus of claim 1, further comprising read means for reading electrical signals converted by said head from magnetic flux variations recorded on said magnetic recording medium, wherein said digital decoder includes means for disconnecting said voltage source from across said winding during operation of said read means.

5. The read/write apparatus of claim 1 wherein:

said head comprises first and second windings connected together at a centertap point, said first winding being adapted to record magnetic flux variations in a first direction on said magnetic recording medium and alternatively to reproduce electrical signals when sensing magnetic flux variations so written in said first direction, and said second winding being adapted to record magnetic flux variations in a second direction on said magnetic recording medium and alternatively to reproduce electrical signals when sensing magnetic flux variations so written in said second direction;

said voltage source is capable of being applied across said first winding when at least a predetermined one of said outputs is at its second voltage state whereby current of a predetermined magnitude is made to flow through said first winding; and said voltage source is capable of being applied across said second winding when at least a predetermined other one of said outputs is at its second voltage state whereby current of a predetermined magnitude is made to flow through said second winding.

6. The read/write apparatus of claim 5, wherein current of a first magnitude is made to flow through said first winding when said predetermined one output is at its second voltage state, and current of a second magnitude is made to flow through said first winding when a predetermined still other one of said outputs is at its second voltage state.

7. The read/write apparatus of claim 6, wherein current of said first magnitude is made to flow through said second winding when said predetermined other one output is at its second voltage state, and current of second magnitude is made to flow through said second winding when a predetermined yet other one of said outputs is at its second voltage state.

8. The read/write apparatus of claim 7, wherein said predetermined number is one.

9. The read/write apparatus of claim 8, further comprising a second magnetic recording and reproducing head having first and second windings, wherein said decoder outputs are divided into a first group associated with a write operation and a second group associated with a read operation, each output of said first group when at its second voltage state causing a specific magnitude of current to applied through a specific winding of a specific head.

10. The read/write apparatus of claim 9, wherein said second voltage state of said outputs is ground potential.

11. The apparatus of claim 10, further comprising an erase head associated with each magnetic recording and reproducing head, each erase head being physically located such that it is exposed to the same path or track on the medium as was exposed to its associated magnetic recording and reproducing head, each erase head acting to erase edge effects including magnetic flux transients on said medium, while leaving intact the desired magnetic flux variations placed on the medium by the associated magnetic recording and reproducing head.

12. The apparatus of claim 11, further comprising delay means for delaying the turn-on and turn-off time of said erase head to compensate for the position of the erase head with respect to the magnetic recording and reproducing head so that erasure is synchronized to begin at a point on the magnetic medium where recording was begun by said recording head.

* * * * *